United States Patent
Cheng et al.

(10) Patent No.: US 9,724,856 B2
(45) Date of Patent: Aug. 8, 2017

(54) MOLDING MACHINE, SYSTEM COMPRISING THE SAME, AND METHOD FOR FORMING PLASTIC PIECE

(71) Applicant: TAIWAN GREEN POINT ENTERPRISES CO., LTD., Taichung (TW)

(72) Inventors: Chin-Chun Cheng, Taichung (TW); Shun-Tien Hung, Taichung (TW)

(73) Assignee: Taiwan Green Point Enterprises Co., Ltd., Taichung (TW)

( * ) Notice: Subject to any disclaimer, the term of this patent is extended or adjusted under 35 U.S.C. 154(b) by 389 days.

(21) Appl. No.: 14/264,849

(22) Filed: Apr. 29, 2014

(65) Prior Publication Data

US 2015/0151466 A1    Jun. 4, 2015

(30) Foreign Application Priority Data

Nov. 29, 2013 (TW) .............................. 102143843 A

(51) Int. Cl.
*B29C 43/58* (2006.01)

(52) U.S. Cl.
CPC ........ *B29C 43/58* (2013.01); *B29C 2043/585* (2013.01); *B29C 2043/5891* (2013.01)

(58) Field of Classification Search
CPC ......... B29C 43/36; B29C 45/06; B29C 33/08; B29C 43/52; B29C 45/26; B29C 45/2681; B29C 2043/106; B29C 35/16; B29C 43/58; H01L 21/565

USPC ......... 425/78, 177, 542, 546, 547, 548, 549, 425/550, 552, 589, 591, 346, 347, 352, 425/353, 354, 355, 406–412, 418
See application file for complete search history.

(56) References Cited

U.S. PATENT DOCUMENTS

| | | | | |
|---|---|---|---|---|
| 2,218,804 A | * | 10/1940 | Baird | B28B 1/02 425/215 |
| 2,375,946 A | * | 5/1945 | Reichelt | B30B 15/16 425/156 |
| 3,122,787 A | * | 3/1964 | Adams | B29C 67/222 220/DIG. 14 |
| 3,695,807 A | * | 10/1972 | Sorensen | B29C 37/005 249/82 |
| 3,754,848 A | * | 8/1973 | Choate | B29C 45/0441 425/556 |
| 4,191,726 A | * | 3/1980 | Stillhard | B29B 13/007 264/121 |
| 4,693,856 A | * | 9/1987 | Rubens | B29C 67/222 264/45.4 |

(Continued)

*Primary Examiner* — Jodi C Franklin
(74) *Attorney, Agent, or Firm* — Volpe and Koenig, P.C.

(57) ABSTRACT

A molding machine, which is operable to mold plastic granules into a plastic piece, includes a machine body, a platform, a heater, and a pressing unit. The platform is installed at the machine body and defines a molding cavity to receive the plastic granules. The heater is installed at the machine body adjacent to the platform. The pressing unit is installed at the machine body and disposed above the platform. The pressing unit includes a pressure cylinder, a telescopic rod driven by the pressure cylinder to extend downward and retract upward, and a pressing plate coupled to the telescopic rod and disposed to correspond in position with the molding cavity, and driven by the pressure cylinder to move relative to the platform.

10 Claims, 5 Drawing Sheets

(56) References Cited

U.S. PATENT DOCUMENTS

| | | | | |
|---|---|---|---|---|
| 4,968,468 A * | 11/1990 | Leinweber | B30B 11/34 | 100/226 |
| 5,015,280 A * | 5/1991 | Kimoto | C03B 11/08 | 249/111 |
| 5,073,099 A * | 12/1991 | Kayano | B29C 43/18 | 100/193 |
| 5,098,276 A * | 3/1992 | Jarabak | H01F 6/00 | 29/599 |
| 5,153,007 A * | 10/1992 | Watkins | B29C 45/78 | 264/40.6 |
| 5,198,163 A * | 3/1993 | Yamamoto | B29C 44/445 | 264/321 |
| 5,219,319 A * | 6/1993 | Katagiri | B29C 31/006 | 425/183 |
| 5,786,079 A * | 7/1998 | Alieri | B29C 33/24 | 425/349 |
| 5,904,746 A * | 5/1999 | Okada | C03B 11/08 | 425/808 |
| 6,042,764 A * | 3/2000 | Eder | B29C 44/0446 | 264/122 |
| 6,106,259 A * | 8/2000 | Lee | B29C 45/02 | 264/272.17 |
| 6,186,766 B1 * | 2/2001 | Davis | B29C 35/16 | 425/384 |
| 6,602,065 B1 * | 8/2003 | Ingram | B29C 33/446 | 425/350 |
| 6,623,672 B2 * | 9/2003 | McCollum | B29C 70/443 | 264/257 |
| 6,697,513 B1 * | 2/2004 | Nakayama | G01M 11/0278 | 382/141 |
| 6,808,383 B1 * | 10/2004 | Kawakami | D21J 3/00 | 425/418 |
| 6,808,662 B1 * | 10/2004 | Hogenkamp | B29C 43/006 | 264/325 |
| 7,195,476 B2 * | 3/2007 | Ito | B29C 43/36 | 100/90 |
| 7,556,492 B2 * | 7/2009 | Waatti | B29C 33/02 | 425/407 |
| 7,708,546 B2 * | 5/2010 | Lee | B29C 33/307 | 425/356 |
| 8,911,229 B2 * | 12/2014 | Lee | B29C 45/26 | 425/129.1 |
| 2001/0014359 A1 * | 8/2001 | Fukuyama | C03B 11/08 | 425/407 |
| 2004/0206121 A1 * | 10/2004 | Autery | C03B 5/02 | 65/83 |
| 2007/0271958 A1 * | 11/2007 | Abe | C03B 11/16 | 65/32.5 |
| 2007/0292982 A1 * | 12/2007 | Holloway | H01L 21/565 | 438/64 |
| 2012/0007264 A1 * | 1/2012 | Kondou | F25C 5/14 | 264/28 |
| 2012/0258848 A1 * | 10/2012 | Ikenishi | C03B 7/12 | 501/44 |
| 2012/0286443 A1 * | 11/2012 | Sato | G01B 11/27 | 264/40.5 |
| 2013/0230618 A1 * | 9/2013 | Lee | B29C 45/26 | 425/588 |
| 2015/0183139 A1 * | 7/2015 | Takano | B29C 70/44 | 264/219 |

* cited by examiner

US 9,724,856 B2

MOLDING MACHINE, SYSTEM COMPRISING THE SAME, AND METHOD FOR FORMING PLASTIC PIECE

CROSS-REFERENCE TO RELATED APPLICATION

This application claims priority of Taiwanese Application No. 10214 3843, filed on Nov. 29, 2013.

BACKGROUND OF THE INVENTION

1. Field of the Invention

The invention relates to a molding machine, more particularly to a molding machine operable to mold plastic granules into a plastic piece. This invention also relates to a system including the molding machine and a method for forming a plastic piece.

2. Description of the Related Art

During a conventional injection molding process, plastic granules are melted by heating and then injected into a mold to form a plastic product. However, the plastic granules may be contaminated so as to cause the molded product to have defects, which lowers the product yield. Therefore, there is a need in the art to provide a system that can perform defect analysis of a molded plastic product at an early stage.

SUMMARY OF THE INVENTION

Therefore, one object of the present invention is to provide a molding machine.

According to a first aspect of the present invention, a molding machine, which is operable to mold plastic granules into a plastic piece, includes a machine body, a platform, a heater, and a pressing unit.

The platform is installed at the machine body and defines a molding cavity adapted to receive the plastic granules.

The heater is installed at the machine body adjacent to the platform and is adapted for heating the platform.

The pressing unit is installed at the machine body and disposed above the platform. The pressing unit includes a pressure cylinder, a telescopic rod connected to and driven by the pressure cylinder to extend downward and retract upward, and a pressing plate coupled to the telescopic rod and disposed to correspond in position with the molding cavity. The pressure cylinder drives the pressing plate via the telescopic rod to move the pressing plate relative to the platform between an initial position, where the pressing plate is away from the molding cavity of the platform, and a molding position, where the pressing plate is close to the molding cavity of the platform so as to cooperate with the platform to form a mold for molding the plastic granules into the plastic piece.

Another object of the present invention is to provide a system that includes the aforementioned molding machine.

According to a second aspect of the present invention, a system for forming a plastic piece and for defect analysis of the plastic piece includes the aforementioned molding machine, an optical sensing unit, and a computing unit.

The optical sensing unit is configured to detect the plastic piece formed using the molding machine.

The computing unit is coupled to the optical sensing unit and is operable for defect analysis of the plastic piece.

Yet another object of the present invention is to provide a method for forming a plastic piece.

According to a third aspect of the present invention, a method for forming a plastic piece includes the following steps of:
heating a raw plastic material;
pressing and molding the heated raw plastic material to form a light-transmissive molded plastic piece;
cooling the molded plastic piece; and
based on defects of the molded plastic piece, determining whether or not the molded plastic piece conforms with predetermined criteria.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
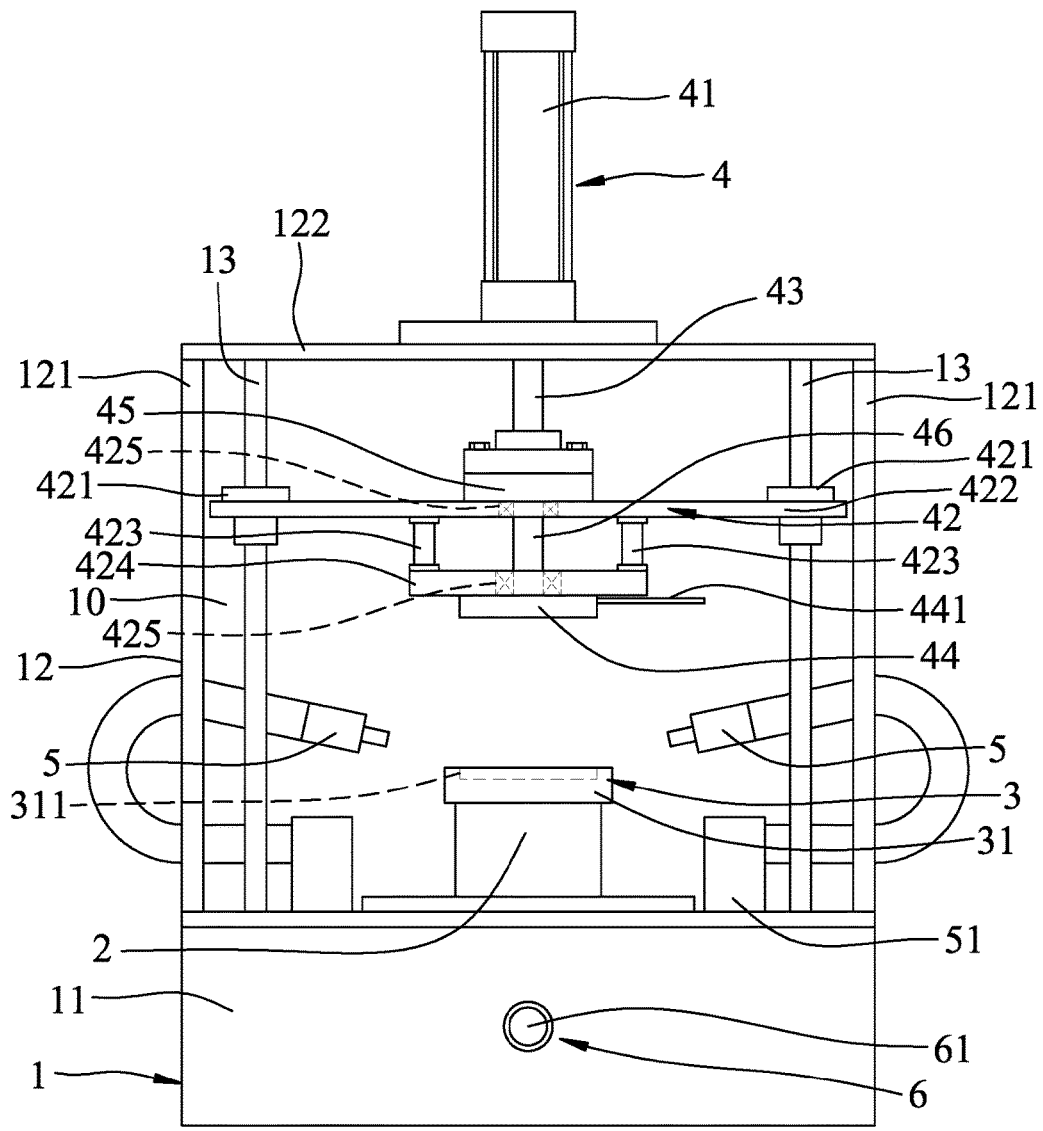
FIG. 1 is a fragmentary front view of a preferred embodiment of a molding machine according to the invention, illustrating a pressing plate at an initial position.
Figure 2:
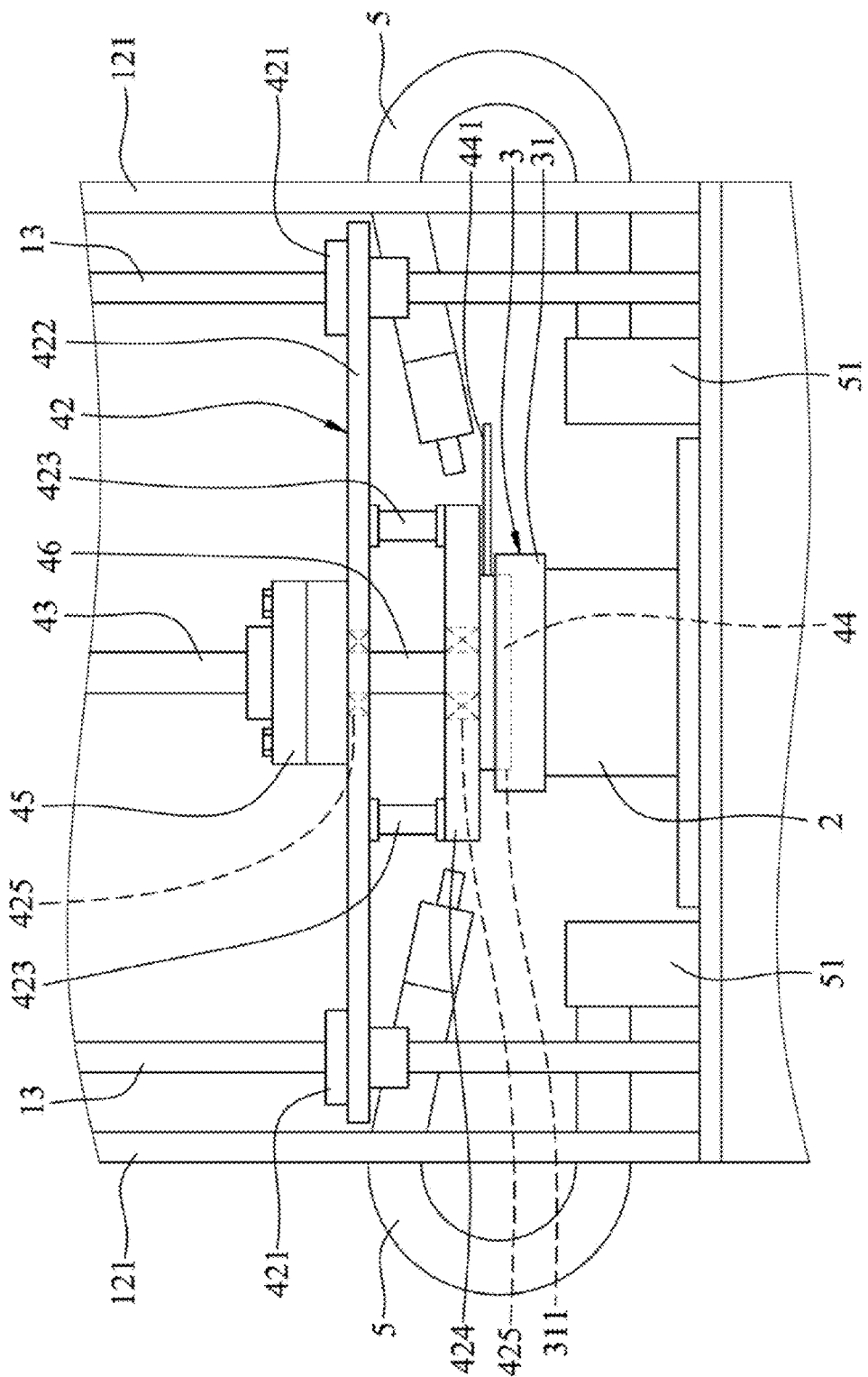
FIG. 2 is a fragmentary front elevation view of the preferred embodiment, illustrating the pressing plate at a molding position.
Figure 3:
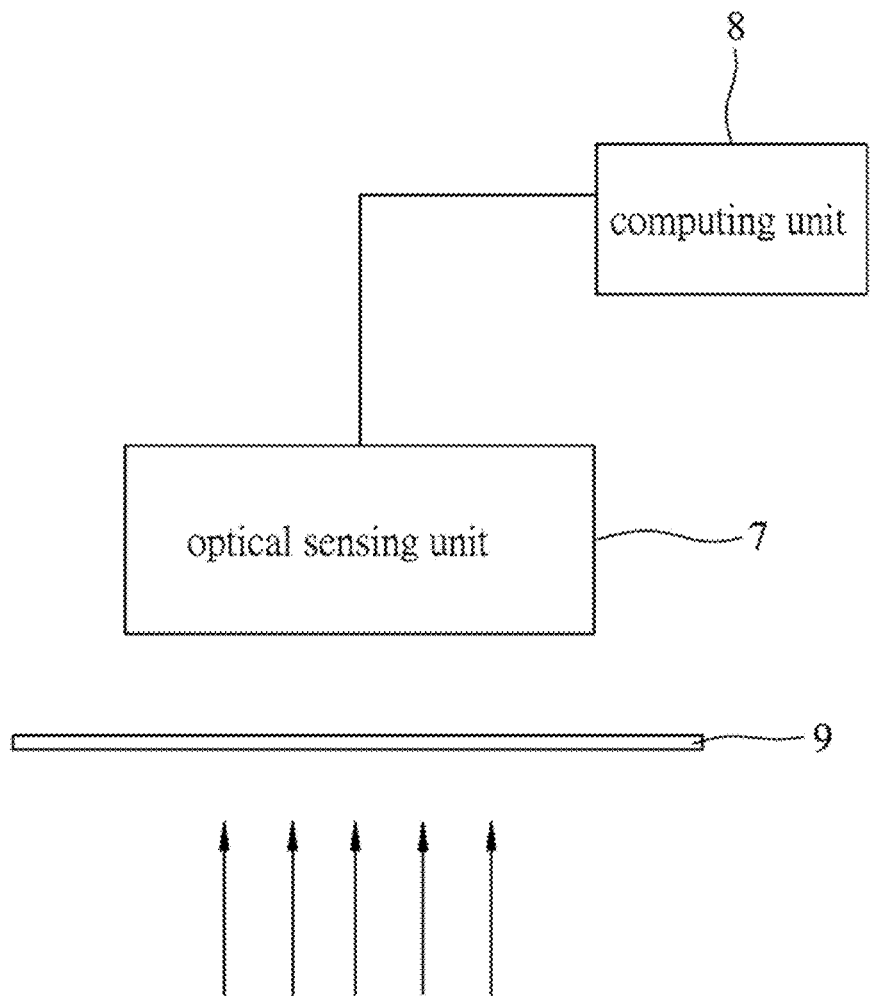
FIG. 3 is a schematic diagram of the preferred embodiment of a system, illustrating an optical sensing unit and a computing unit used to perform defect analysis of a molded plastic piece.

Referring to FIGS. 1 to 3, the preferred embodiment of a system for forming a plastic piece 9 and for defect analysis of the plastic piece 9 according to the present invention is shown to include a molding machine, an optical sensing unit 7 and a computing unit 8.

As shown in FIGS. 1 and 2, the molding machine includes a machine body 1, a heater 2, a platform 3, a pressing unit 4, a plurality of air blowing devices 5 and a control unit 6.

The machine body 1 includes a base 11, and a casing 12 disposed on the base 11. In this embodiment, the casing 12 includes a pair of side plates 121 and a top plate 122. The side plates 121, the top plate 122, and the base 11 cooperatively define a receiving space 10. The side plates 121 are capable of preventing dust from entering into the receiving space 10 so as to prevent plastic granules from being contaminated.

The heater 2 is installed at the machine body 1 adjacent to the platform 3 and is adapted for heating the platform 3. In this embodiment, the heater 2 is disposed on the base 11 of the machine body 1, below the platform 3 and in the receiving space 10.

The platform 3 is installed at the machine body 1 and defines a molding cavity 311 adapted to receive plastic granules. In this embodiment, the platform 3 is installed in the receiving space 10 and includes a molding plate 31 that is disposed on the heater 2 and that is formed with the molding cavity 311 (see FIG. 2).

It is worth noting that the heater 2 may be disposed in the base 11 or beside from the platform 3 so long as the plastic granules, which are received in the molding cavity 311, can be heated by the heater 2.

The pressing unit 4 is installed at the machine body 1 and is disposed above the platform 3. The pressing unit 4 includes a pressure cylinder 41, a telescopic rod 43 connected to and driven by the pressure cylinder 41 to extend upward and to retract downward, and a pressing plate 44 coupled to the telescopic rod 43 and disposed to correspond in position with the molding cavity 311 of the platform 3. In this embodiment, the pressure cylinder 41 is disposed on a top surface of the top plate 121, and the telescopic rod 43 extends from the pressure cylinder 41 to penetrate through the top plate 121 toward the platform 3. In this embodiment, the pressing plate 44 is in a horizontal arrangement.

As shown in FIGS. 1 and 2, the pressure cylinder 41 drives the pressing plate 44 via the telescopic rod 43 to move the pressing plate 44 relative to the platform 3 between an initial position (see FIG. 1), where the pressing plate 44 is away from the molding cavity 311 of the platform 3, and a molding position (see FIG. 2), where the pressing plate 44 is close to the molding cavity 311 of the platform 3, so as to cooperate with the platform 3 to form a mold for forming the plastic granules into the plastic piece 9 (see FIG. 3).

The air blowing devices 5 are installed at the machine body 1 via stationary seats 51 and are configured to blow air currents toward the platform 3, thereby being able to cool the plastic piece 9 formed in the molding cavity 311.

The control unit 6 includes a control button 61 installed at the base 11 of the machine body 1. The control button 61 is operable to control the heater 2 and the pressing unit 4 to drive the pressing plate 44 to move between the initial and molding positions.

It is worth noting that, while the pressing plate 44 is at the molding position, a distance between the pressing plate 44 and a bottom surface of the molding cavity 311 is equal to or less than 1.5 mm. Such distance allows the molded plastic piece 9 to be sufficiently thin and to exhibit light transmissibility.

In this embodiment, the pressing unit 4 further includes a rotary mechanism that couples the pressing plate 44 to the telescopic rod 43 and that is operable to drive the pressing plate 44 to rotate relative to the platform 3. The rotary mechanism includes a rotary motor 45 that is connected to a bottom end of the telescopic rod 43, and a shaft 46 that interconnects the rotary motor 45 and the pressing plate 44. In this embodiment, the pressing unit 4 may further include a grip member 441 that is manually operable to drive the pressing plate 44 to rotate about the shaft 46 and relative to the platform 3. Further, the shaft 46 is long enough to ensure that the rotary motor 45 may function normally during molding without being affected by the heater 2.

In this embodiment, the machine body 1 further includes a plurality of guiding poles 13 extending in a top-bottom direction and disposed between the top plate 122 and the base 11 in the receiving space 10. The pressing unit 4 further includes a guiding device 42 including a plurality of guiding seats 421 each of which surrounds and is movable along a respective one of the guiding poles 13, a guiding plate 422 that is co-movably mounted to the guiding seats 421 and that is disposed in a horizontal arrangement, a plurality of supporting rods 423 fixedly mounted to a bottom surface of the guiding plate 422, a bottom plate 424 disposed below the guiding plate 422 and fixedly mounted to distal ends of the supporting rods 423, and a pair of bearings 425 respectively installed at the guiding plate 422 and the bottom plate 424, thereby allowing the shaft 46 to rotate relative to the guiding device 42, as well as to extend to penetrate through the guiding plate 422 and the bottom plate 424 via the bearings 425.

Figure 4:
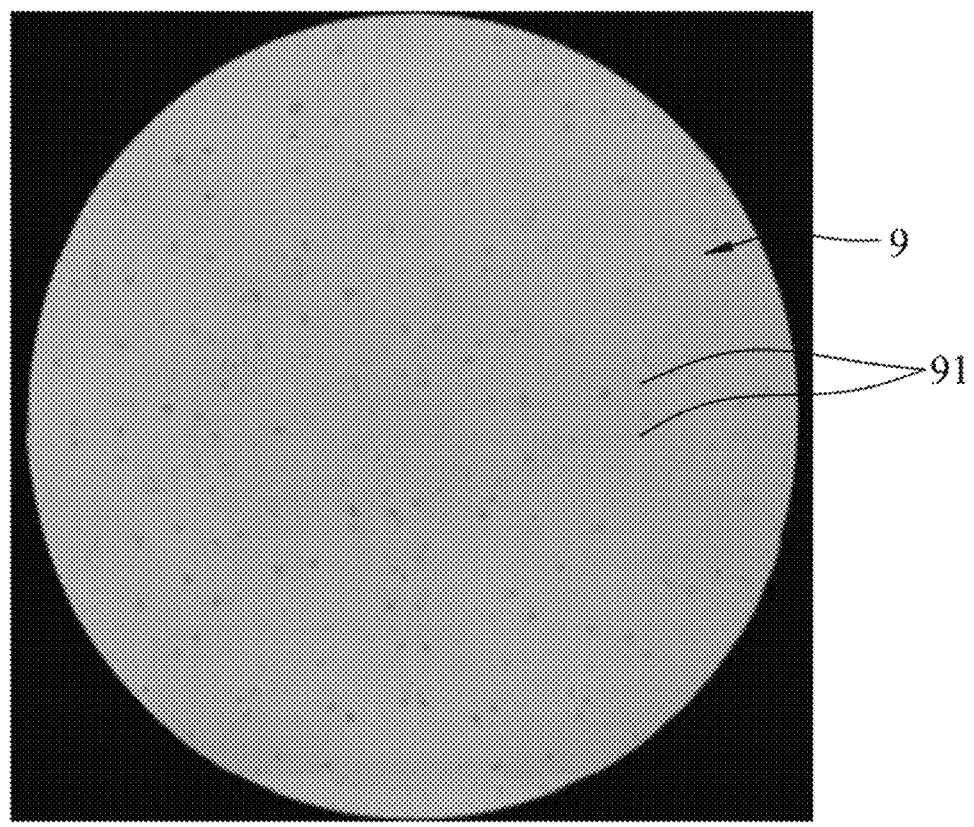
FIG. 4 is a photograph of the molded plastic piece.

As shown in FIG. 3 and further referring to FIG. 4, the optical sensing unit 7 is configured to detect the plastic piece 9 formed by utilizing the molding machine of the present invention. In this embodiment, the optical sensing unit 7 is disposed independently from the machine body 1 of the molding machine and is exemplified as a camera herein. The computing unit 8 is coupled to the optical sensing unit 7 and is operable to process a detection output of the optical sensing unit for defect analysis of the molded plastic piece 9.

As shown in FIGS. 1 and 3, it should be noted that, in this embodiment, the molded plastic piece 9 is manually transported with the platform 3 to the optical sensing unit 7. However, transportation of the molded plastic piece 9 may be performed using automated robotic arms (not shown in the drawings).

It is also worth noting that the defect analysis of the molded plastic piece 9 may be performed by human inspectors without the aid of the optical sensing unit 7 and the computing unit 8.

Figure 5:
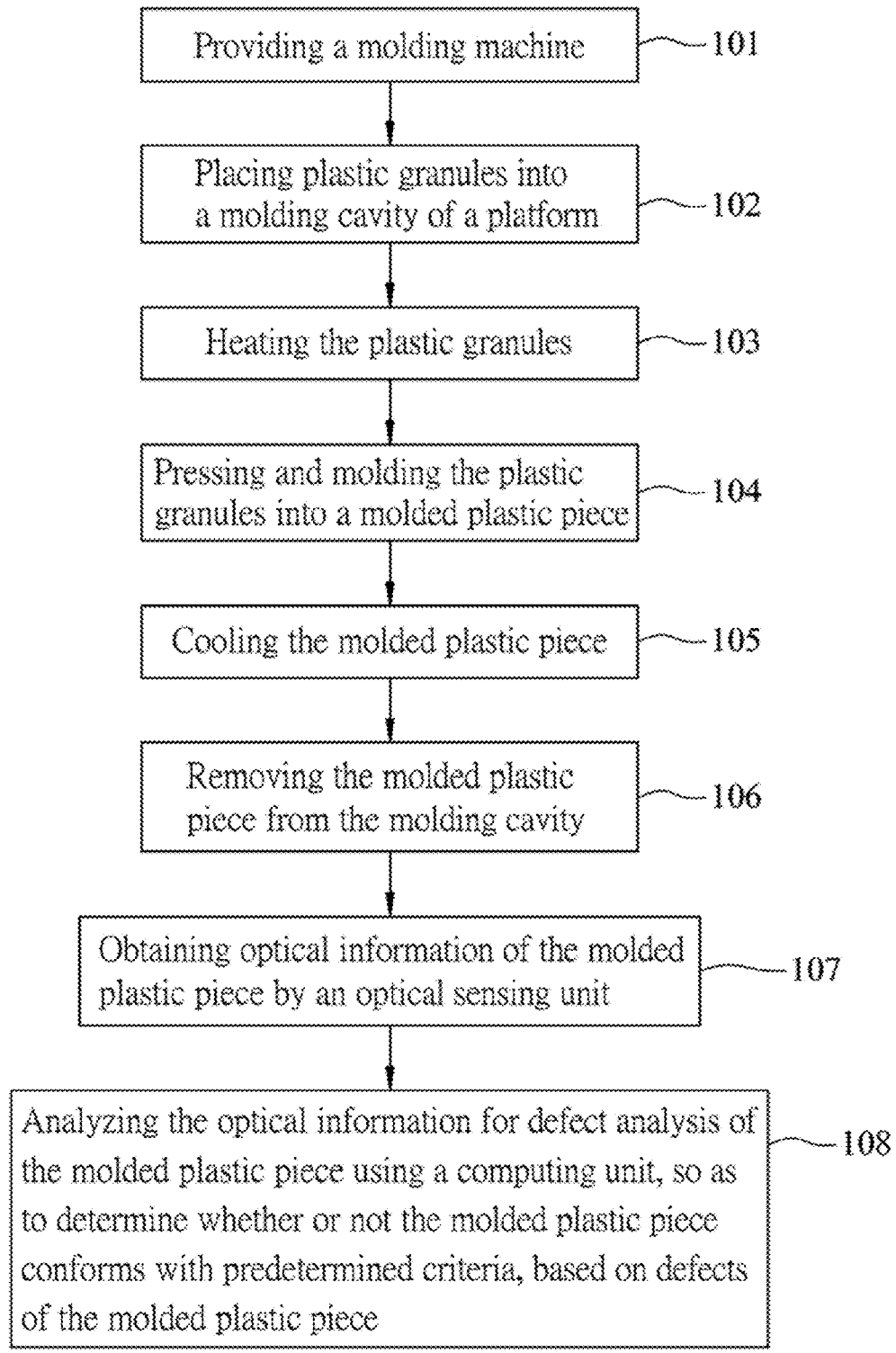
FIG. 5 is a flow chart illustrating the preferred embodiment of a method for forming a plastic piece.

Referring to FIG. 5, the preferred embodiment of a method for forming the plastic piece 9 using the molding machine includes the following steps:

Step 101: providing the abovementioned molding machine.

Step 102: placing the plastic granules into the molding cavity 311 of the platform 3. In this embodiment, the amount of the plastic granules is about 4 grams.

Step 103: turning on the heater 2 to heat the platform 3, so as to melt the plastic granules in the molding cavity 311. In this embodiment, the plastic granules are heated to a temperature ranging from 270° C. to 290° C.

Step 104: pressing the button 61 of the control unit 6 to actuate the pressure cylinder 41 to move the pressing plate 44 downwardly via the telescopic rod 43 toward the molding position so as to press and mold the plastic granules into a molded plastic piece 9. The guiding device 42 is also driven by the telescopic rod 43 to move downwardly along the guiding poles 13, so that, being assured by the guiding device 42, the pressing plate 44 remains in the horizontal arrangement while pressing the plastic granules.

It should be further noted that the pressing plate 44 rotates while at the molding position. In this embodiment, rotation of the pressing plate 44 is driven by the rotary mechanism, where the rotary motor 45 drives the shaft 46, as well as the pressing plate 44, to rotate relative to the molding cavity 311 of the platform 3. Such configuration provides a relatively smooth and uniform shape to the molded plastic piece 9. Moreover, instead of the rotary motor 45, the pressing plate 44 may be manually rotated via the grip member 441. In general, it takes about 3 minutes for pressing and molding the plastic granules to form the plastic piece 9.

Step 105: cooling the molded plastic piece 9. In this embodiment, the molded plastic piece 9 is cooled by the air blowing devices 5, which blow air currents toward the platform 3. After Step 104, the pressing plate 44 stops rotating but remains pressing the molded plastic piece 9 in the molding cavity 311 until the temperature of the molded plastic piece 9 drops to 60° C. or less.

Step 106: retracting the telescopic rod 43 to move the pressing plate 44 upward, and removing the molded plastic piece 9 from the molding cavity 311 of the platform 3. The molded plastic piece 9 is light-transmissive and has a thickness of less than 1.5 mm (preferably of about 0.2 mm) and a diameter of about 10 cm.

Step 107: obtaining optical information of the molded plastic piece 9. In this embodiment, the optical information is obtained by using the optical sensing unit 7 to capture an image of the molded plastic piece 9. However, Step 107 may be performed by human inspectors as described hereinabove.

Step 108: analyzing the optical information for defect analysis of the molded plastic piece 9 using the computing unit 8, so as to determine whether or not the molded plastic piece 9 conforms with predetermined criteria, based on defects of the molded plastic piece 9. Since contamination of the plastic granules will result in appearance of defect spots 91 of the molded plastic piece 9 in the image obtained from the optical sensing unit 7 (see FIG. 4), the predetermined criteria may be set up by determining the number of the defect spots 91 shown in the image of the molded plastic piece 9. In this embodiment, after inspecting every five of the molded plastic pieces 9, the average number of less-than—0.01 $mm^2$—sized defect spots 91 should be less than 30, the average number of 0.01—to—0.02 $mm^2$—sized defect spots 91 should be less than 10, the average number of 0.02—to—0.04 $mm^2$—sized defect spots 91 should be less than 1, and average number of greater-than—0.04 $mm^2$—sized defect spots 91 should be zero.

In this embodiment, the optical information is analyzed by performing image recognition utilizing the computing unit 8, but it should be noted that the optical information may be analyzed by human inspectors as previously mentioned hereinabove.

To sum up, by using the molding machine to form the plastic piece 9, followed by using the optical sensing unit 7 and the computing unit 8 to perform defect analysis of the plastic piece 9, early stage inspection of the plastic piece 9 is thereby achieved by the system of the present invention, and the product yield can thus be improved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A molding machine operable to mold plastic granules into a plastic piece, said molding machine comprising:
    a machine body;
    a platform installed at said machine body and defining a molding cavity adapted to receive the plastic granules;
    a heater installed at said machine body adjacent to said platform and adapted for heating said platform; and
    a pressing unit installed at said machine body and disposed above said platform, said pressing unit including a pressure cylinder, a telescopic rod connected to and driven by said pressure cylinder to extend downward and retract upward, and a pressing plate coupled to said telescopic rod and disposed to correspond in position with said molding cavity, said pressure cylinder driving said pressing plate via said telescopic rod to move said pressing plate relative to said platform between an initial position, where said pressing plate is away from said molding cavity, and a molding position, where said pressing plate extends into said molding cavity so as to cooperate with said platform to form a mold for forming the plastic granules into the plastic piece,
    wherein said machine body includes a plurality of guiding poles extending in a top-bottom direction, and
    wherein said pressing unit further includes a guiding device and a rotary mechanism,
    said guiding device including a horizontal guiding plate moveable along said guiding poles, a plurality of supporting rods fixedly mounted to and downwardly extending from said guiding plate, a bottom plate that is disposed below said guiding plate and that is fixedly mounted to bottom ends of said supporting rods, and
    said rotary mechanism including a rotary motor that is disposed on said guiding plate and that is connected to a bottom end of said telescopic rod, and a shaft that is connected between said rotary motor and said pressing plate, said pressing plate being disposed beneath said bottom plate, said rotary motor being operable to rotate said shaft and said pressing plate relative to said platform.

2. The molding machine according to claim 1, wherein said machine body includes a casing that defines a receiving space, and said platform is installed in said receiving space.

3. The molding machine according to claim 1, further comprising an air blowing device installed at said machine body and configured to blow air currents toward said platform.

4. The molding machine of claim 1, wherein said guiding device further includes a plurality of guiding seats each of which is sleeved around and slidable along a respective one of said guiding poles and a pair of bearings respectively installed in said guiding plate and said bottom plate, said horizontal guiding being co-movably mounted to said guiding seats, said shaft extending through said bearings.

5. A system for forming a plastic piece and for defect analysis of the plastic piece, said system comprising:
    a molding machine including
        a machine body,
        a platform installed at said machine body and defining a molding cavity adapted to receive plastic granules,
        a heater installed at said machine body adjacent to said platform and adapted for heating said platform, and
        a pressing unit installed at said machine body and disposed above said platform, said pressing unit including a pressure cylinder, a telescopic rod connected to and driven by said pressure cylinder to extend downward and retract upward, and a pressing plate coupled to said telescopic rod and disposed to correspond in position with said molding cavity, said pressure cylinder driving said pressing plate via said telescopic rod to move said pressing plate relative to said platform between an initial position, where said pressing plate is away from said molding cavity, and a molding position, where said pressing plate extends into said molding cavity so as to cooperate with said platform to form a mold for forming the plastic granules into the plastic piece,;
    an optical sensing unit configured to detect the plastic piece formed using said molding machine; and
    a computing unit coupled to said optical sensing unit and operable to process a detection output of said optical sensing unit for defect analysis of the plastic piece,
    wherein said machine body includes a plurality of guiding poles extending in a top-bottom direction, and
    wherein said pressing unit further includes a guiding device and a rotary mechanism,
    said guiding device including a horizontal guiding plate that is moveable along said guiding poles, a plurality of supporting rods fixedly mounted to and downwardly extending from said guiding plate, a bottom plate that is disposed below said guiding plate and that is fixedly mounted to bottom ends of said supporting rods, and
    said rotary mechanism including a rotary motor that is disposed on said guiding plate and that is connected to a bottom end of said telescopic rod, and a shaft that is connected between said rotary motor and said pressing plate, said pressing plate being disposed beneath said bottom plate, said rotary motor being operable to rotate said shaft and said pressing plate relative to said platform.

6. The molding machine of claim 5, wherein said guiding device further includes a plurality of guiding seats each of which is sleeved around and slidable along a respective one of said guiding poles and a pair of bearings respectively installed in said guiding plate and said bottom plate, said horizontal guiding being co-movably mounted to said guiding seats, said shaft extending through said bearings.

7. A molding machine operable to mold plastic granules into a plastic piece, said molding machine comprising:
   a machine body including a base, a top plate and a plurality of guiding poles extending in a top-bottom direction between said base and top plate;
   a platform installed on said base and having a molding cavity;
   a pressing unit installed on said top plate and including
      a pressure cylinder,
      a telescopic rod connected to and driven by said pressure cylinder to extend downward and retract upward,
      a horizontal guiding plate mounted slidably on said guiding poles to move upward or downward,
      a rotary motor that is mounted to said horizontal guiding plate and that is connected to a bottom end of said telescopic rod,
      a bearing disposed in said horizontal guiding plate,
      a shaft connected to said rotary motor and extending downward through said bearing, and
      a pressing plate connected to a bottom end of said shaft,
      said pressure cylinder driving said pressing plate via said telescopic rod to move said pressing plate into or away from said molding cavity, said rotary motor being operable to rotate said pressing plate relative to said molding cavity.

8. The molding machine of claim 7, wherein said pressing unit further includes a plurality of supporting rods fixedly mounted to and downwardly extending from said guiding plate, a bottom plate fixedly mounted to bottom ends of said supporting rods, and an additional bearing disposed in said bottom plate, said pressing plate being disposed beneath said bottom plate, said shaft extending through said additional bearing and connected to said pressing plate.

9. The molding machine of claim 8, further comprising a heater installed in said machine body adjacent to said platform for heating said platform.

10. The molding machine of claim 9, wherein said pressing unit further includes a plurality of guiding seats each of which is sleeved slidably around a respective one of said guiding poles, said guiding plate being co-movably mounted to said guiding seats.

\* \* \* \* \*